(12) United States Patent
Dudar

(10) Patent No.: US 10,124,791 B2
(45) Date of Patent: Nov. 13, 2018

(54) FUEL PUMP CONTROL SYSTEM FOR SADDLE FUEL TANKS

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 138 days.

(21) Appl. No.: 15/378,524

(22) Filed: Dec. 14, 2016

(65) Prior Publication Data

US 2018/0162353 A1    Jun. 14, 2018

(51) Int. Cl.
| | |
|---|---|
| *B60K 15/03* | (2006.01) |
| *B60W 20/12* | (2016.01) |
| *B60W 10/20* | (2006.01) |
| *B60W 10/30* | (2006.01) |
| *F02M 37/02* | (2006.01) |
| *F04F 5/24* | (2006.01) |
| *F04F 5/48* | (2006.01) |
| *F04B 23/08* | (2006.01) |

(52) U.S. Cl.
CPC ............ *B60W 20/12* (2016.01); *B60K 15/03* (2013.01); *B60W 10/20* (2013.01); *B60W 10/30* (2013.01); *F02M 37/025* (2013.01); *F04B 23/08* (2013.01); *F04F 5/24* (2013.01); *F04F 5/48* (2013.01); *B60K 2015/0325* (2013.01); *B60K 2015/03138* (2013.01); *B60K 2015/03217* (2013.01); *B60W 2550/13* (2013.01); *Y10S 903/93* (2013.01)

(58) Field of Classification Search
CPC .............................. B60W 20/12; B60K 15/03
See application file for complete search history.

(56) References Cited

U.S. PATENT DOCUMENTS

| 6,170,472 B1* | 1/2001 | Gaston ................. F02M 37/106 123/509 |
|---|---|---|
| 8,401,761 B2 | 3/2013 | Bohr et al. |
| 8,955,545 B2 | 2/2015 | Murabayashi et al. |
| 8,984,934 B2 | 3/2015 | Sweppy et al. |
| 2013/0008524 A1* | 1/2013 | Murabayashi ..... F02M 37/0094 137/142 |
| 2015/0274028 A1* | 10/2015 | Payne ................. B60L 11/1861 701/22 |
| 2016/0129782 A1* | 5/2016 | Tipton ................. B60K 15/077 137/550 |

(Continued)

FOREIGN PATENT DOCUMENTS

DE    102006024328 A1    11/2007

*Primary Examiner* — Jess Whittington
(74) *Attorney, Agent, or Firm* — David B. Kelley; Brooks Kushman P.C.

(57) ABSTRACT

A vehicle includes a fuel tank, a jet pump and a controller. The fuel tank has a passive side and an active side. Each of the sides includes a fuel level indicator. The jet pump is disposed within the active side and is configured to maintain a fuel level above a first threshold, based on each of the indicators, on the active side by siphoning fuel from the passive side during operation in a combustion mode. The controller is configured to, in response a battery charge level being below a second threshold during operation in an electric mode and a detected hill climb via a route guidance system, activate the jet pump to siphon fuel such that a fuel level within the active side rises above the first threshold.

12 Claims, 3 Drawing Sheets

(56) References Cited

U.S. PATENT DOCUMENTS

2018/0017028 A1\* 1/2018 Kalyuta .............. F02M 37/025
2018/0134275 A1\* 5/2018 Books .................. B60W 20/12
2018/0222309 A1\* 8/2018 Follen .................... B60K 6/48

\* cited by examiner

FUEL PUMP CONTROL SYSTEM FOR SADDLE FUEL TANKS

TECHNICAL FIELD

The present disclosure relates to a fuel pump control system for saddle fuel tanks.

BACKGROUND

Certain vehicles utilize more than one fuel tank when operating a vehicle. For example, a vehicle may have an active fuel tank and a passive fuel tank. The passive fuel tank and the active fuel tank are typically arranged across the vehicle in an east-to-west direction such that the active fuel tank is disposed on one side of the vehicle, such as a driver side and the passive fuel tank is disposed on the opposite side of the vehicle, such as a passenger side. In most systems, the passive fuel tank feeds the active fuel tank when the active tank is depleted. Therefore, the active fuel tank and the passive fuel tank may be connected across the vehicle. Vehicles that use active and passive fuel tanks, which are connected, are referred to as saddle tanks. Saddle fuel tanks allow the vehicle to store more fuel and operate over a longer distance and duration due to the additional fuel storage of the passive fuel tank.

SUMMARY

A fuel pump control system for a vehicle includes a pump, and a controller. The pump is disposed within an active side of a fuel tank and configured to move fuel from a passive side to the active side. The controller is configured to, in response to an indicator indicating a fuel level of the active side is below a first threshold and a battery charge is below a second threshold, activate the pump to increase the fuel level.

A vehicle includes a fuel tank, a jet pump and a controller. The fuel tank has a passive side and an active side. Each of the sides includes a fuel level indicator. The jet pump is disposed within the active side and is configured to maintain a fuel level above a first threshold, based on each of the indicators, on the active side by siphoning fuel from the passive side during operation in a combustion mode. The controller is configured to, in response a battery charge level being below a second threshold during operation in an electric mode and a detected hill climb via a route guidance system, activate the jet pump to siphon fuel such that a fuel level within the active side rises above the first threshold.

A vehicle control method includes, in response to detecting a hill climb via a guidance system during operation in an electric mode when a charge level of a battery is below a second threshold and a fuel level in an active side of a fuel tank is below a first threshold, activating a fuel pump to draw fuel from a passive side of the fuel tank to raise the fuel level above the first threshold.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
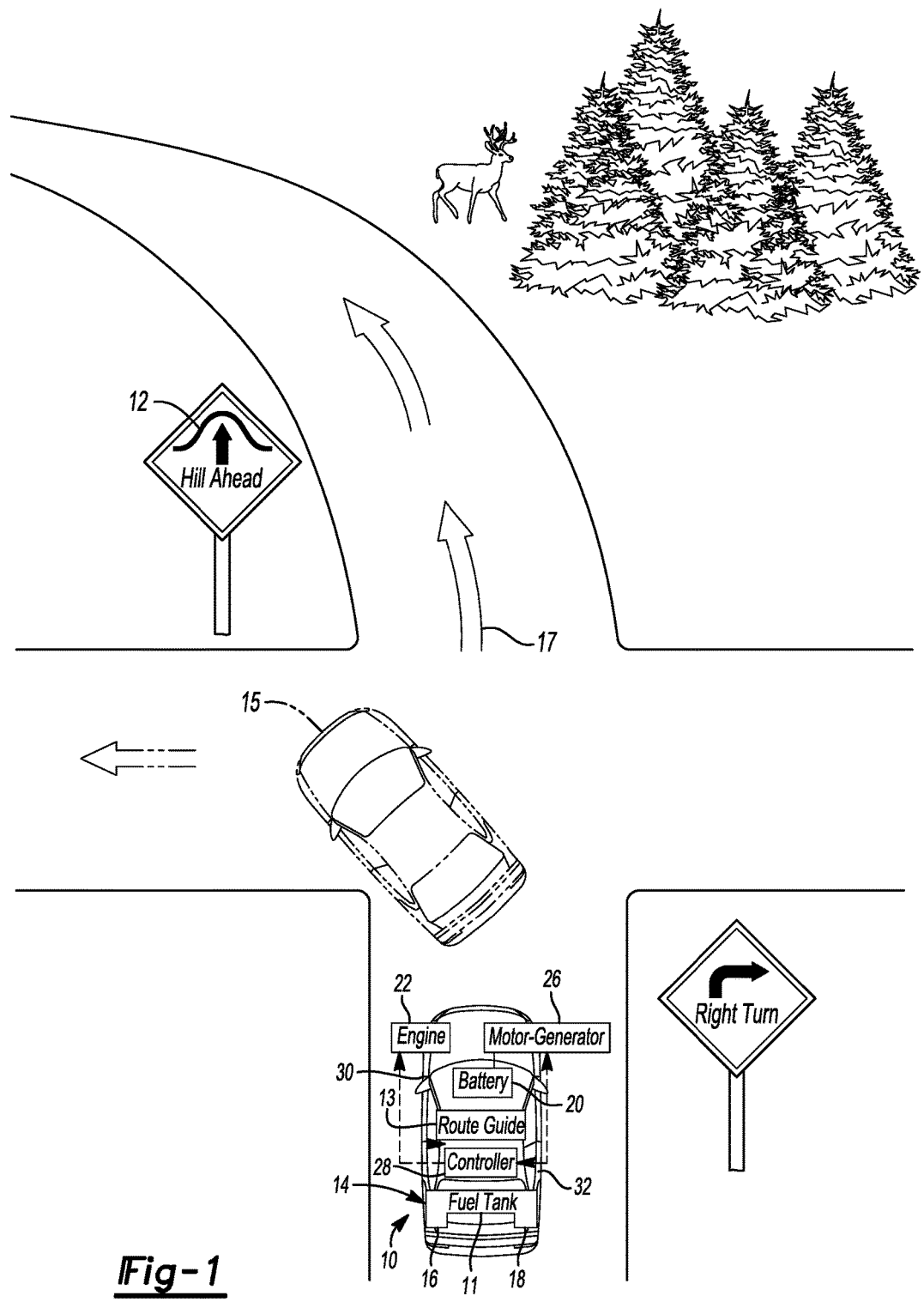
FIG. 1 is a top view of a vehicle having a fuel pump control system for a saddle fuel tank.

FIG. 1 depicts a top view of a vehicle 10 approaching an inclined roadway 12. The vehicle 10 includes a fuel tank 14, which may be a saddle fuel tank 14 having an active side 16 and a passive side 18. In addition to the fuel tank 14, the vehicle 10 may further include a battery 20 if the vehicle 10 is a hybrid-electric vehicle. In at least one embodiment, the vehicle 10 includes both the fuel tank 14 for combustion driven operation of the vehicle 10 via an engine 22 and a battery 20 for electric driven operation of the vehicle 10 via a motor-generator 26. In at least one other embodiment, the vehicle 10 may include multiple fuel tanks 14 or multiple batteries 20 and may operate using either the fuel tanks 14 or the batteries 20, individually or in combination to drive the vehicle 10. The vehicle 10 also includes a controller 28. The controller 28 may be connected to the fuel tank 14 and the battery 20 to manage operation of the vehicle 10 using the engine 22 and the motor-generator 26. For example, the controller 28 may instruct the vehicle 10 to operate in a combustion only mode, in which the vehicle 10 operates using only the engine 22, or the controller 28 may instruct the vehicle 10 to operate in an electric only mode, in which the vehicle 10 operates using only the motor-generator 26. The controller 28 may also instruct the vehicle 10 to operate in a hybrid mode, in which the engine 22 and the motor-generator 26 provide torque to the vehicle 10.

As will be described in more detail below, the controller 28 may use a variety of inputs to determine whether the vehicle 10 operates in the combustion only mode, the electric only mode or using a combination of combustion and electrical power to drive the vehicle 10. Examples of inputs may be an amount (not shown) of fuel available within the fuel tank 14 and an amount (not shown) of charge available within the battery 20. Another example of an input may be detection of the inclined roadway 12 via a route guidance system 13. Detection of the inclined roadway 12 through the route guidance system 13 may be accomplished using a variety of methods, including, but not limited to, GPS detection, radar detection, camera detection, gyroscopic detection, sensor detection or any other method to detect whether the vehicle 10 is approaching or on an inclined roadway 12. Detection of the inclined roadway 12 allows the controller 28 to determine the appropriate source, the engine 22, the motor-generator 26 or a combination of the engine 22 and the motor-generator 26, for powering the vehicle 10 across the inclined roadway 12. To determine the appropriate source for powering the vehicle 10 across the inclined roadway 12, the controller 28 may use indications of the amount (not shown) of fuel available within the fuel tank 14 and the amount (not shown) of charge available within the battery 20.

In vehicles that use saddle fuel tanks 14, the amount (not shown) of fuel within the fuel tank 14 may vary during operation of the vehicle 10. Fuel transfers from the active side 16 to the passive side 18, via a top vapor dome 11 interconnecting the active and passive sides 16, 18, in any instance in which the vehicle 10 experiences centrifugal force, which transfers fuel naturally from the active side 16 to the passive side 18. Fuel may be inadvertently transferred from the active side 16 to the passive side 18 of the saddle fuel tank 14 during operation of the vehicle 10 on a cloverleaf highway entrance or exit ramp. Likewise, fuel may be inadvertently transferred from the active side 16 to the passive side 18 of the saddle fuel tank 14 during a right turn. In this embodiment, the active side 16 is associated with a driver side 30 of the vehicle 10 and the passive side 18 is associated with a passenger side 32 of the vehicle 10. In at least one other embodiment, the active side 16 may be associated with the passenger-side 32 of the vehicle 10 and the passive side 18 may be associated with a driver side 30 of the vehicle 10.

In response to detection of the incline roadway 12, the controller 28 may use an amount (not shown) of fuel in the active side 16 in addition to an amount (not shown) of fuel in the passive side 18 to provide a powering strategy to operate the vehicle over the incline roadway 12, as described above. Fuel shifting between the active side 16 and the passive side 18 may be problematic when determining whether the fuel tank 14 has enough fuel to power the vehicle 10 over the inclined roadway 12. The controller 28 may be further configured to alter the amount of fuel in the active side 16 and the passive side 18 in order to appropriately determine the amount of fuel for operating with and the combustion only and hybrid modes of the vehicle 10.

In addition to detecting the inclined roadway 12 or hill climb, the route guidance system 13 may also be configured to determine a maneuver 15, such as turning left, which may shift fuel from the passive side 18 to the active side 16. For example, if the route guidance system 13 detects a hill climb on a current route 17 the vehicle 10 is traveling, the route guidance system 13 may check for alternate routes that may involve the vehicle 10 operating maneuvers 15 to naturally transfer fuel from the passive side 18 to the active side 16, such as entering or exiting a cloverleaf ramp on a highway described above. If the route guidance system 13 detects an alternate route 19 having a maneuver 15 to transfer fuel from the passive side 18 to the active side 16 via the top vapor dome 11, the route guidance system 13 may instruct the controller 28 to implement the alternate route 19 before approaching the inclined roadway 12. The alternate route 19 may be any route different from the current route 17, which includes a maneuver 15 that causes the vehicle 10 to be subject to centrifugal forces, which may transfer fuel from the passive side 18 to the active side 16. As will be described in more detail below, the controller 28 may also calculate whether implementing the alternate route 19 provides adequate fuel to the active side 16 to power the vehicle over the inclined roadway 12, or hill climb.

Figure 2:
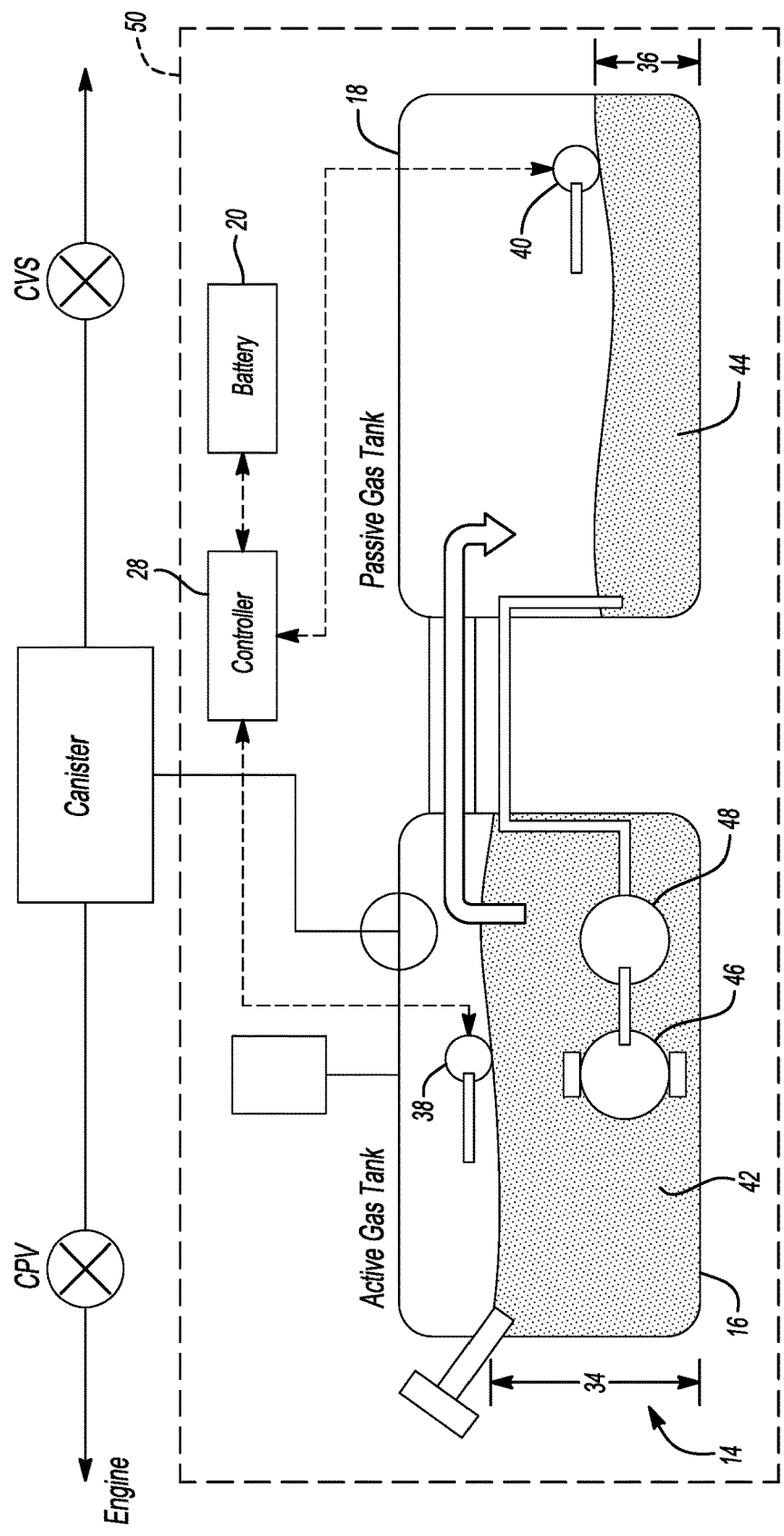
FIG. 2 is a schematic view of a saddle fuel tank.

Referring to FIG. 2, a schematic view of the saddle fuel tank 14 is shown with the active side 16 having a first fuel level 34 and the passive side 18 having a second fuel level 36. The first and second fuel levels 34, 36 are detected using first and second indicators 38, 40, respectively. The first indicator 38 may be disposed on the active side 16 and configured to indicate to the controller 28 the amount 42 of fuel within the active side 16 resulting in the first fuel level 34 of the active side 16 of the fuel tank 14. The second indicator 40 may be disposed on the passive side 18 and configured to indicate to the controller 28 the amount 44 of fuel within the passive side 18 resulting in the second fuel level 36 of the passive side 18 of the fuel tank 14. As stated above, the amounts 42, 44 and therefore the first and second fuel levels 34, 36 may vary during operation of the vehicle 10 and the first and second indicators 38, 40 may be configured to continuously send fuel level information to the controller 28. Therefore, the first and second indicators 38, 40 may be operatively connected to the controller 28 such that the controller 28 may determine the first and second fuel levels 34, 36 of the active and passive sides 16, 18 of the fuel tank 14 at any point during operation of the vehicle 10.

The saddle fuel tank 14 may further include a pump 46. The pump 46 may be configured to move fuel from the passive side 18 to the active side 16, which allows the passive side 18 to store fuel for use during operation of the vehicle 10. The pump 46 may include a jet pump 48 configured to siphon fuel from the passive side 18 to the active side 16. In this embodiment, the jet pump 48 pulls fuel from the passive side 18 into the active side 16 and the fuel pump 46 pumps fuel from the active side 16 to the engine 22, wherein the fuel pump 46 is connected to the jet pump 48 to operate the jet pump 48. In at least one other embodiment, the pump 46 may be a fuel pump 46 configured to draw fuel from the passive side 18 to the active side 16 to provide further control of the first and second fuel levels 34, 36. Therefore, the controller 28 may be configured to operate the fuel pump 46 and the jet pump 48 to ensure that the active side 16 maintains an optimum fuel level 34 during operation of the vehicle 10. The optimum fuel level 34 of the active side 16 may vary depending on vehicle operation circumstances. For example, if the vehicle 10 is approaching an inclined roadway 12, the controller 28 may operate the pump 46 such that the fuel level 34 of the active side 16 is above a first threshold for operation in the combustion mode. Likewise, the controller 28 may be configured to activate the pump 46 to modulate the fuel level 34 of the active side 16 depending on a charge (not shown) of the battery 20 for operation in the hybrid mode.

As described, operation of the pump 46 may include operation of both the fuel pump 46 and the jet pump 48. For example, by activating the fuel pump 46, the jet pump 48 may also be activated and both the fuel pump 46 and the jet pump 48 operate to control the fuel level 34 of the active side 16 of the fuel tank 14. In at least one other embodiment, the controller 28 may be configured to operate the fuel pump 46 independent of operation of the jet pump 48 and operate the jet pump 48 independent of the fuel pump 46. As will be described in more detail below, the controller 28 may use a variety of information to determine when to activate the pump 46 such that the fuel level 34 of the active side 16 is optimum for performance in either or both of the combustion mode or the hybrid mode. In this way, the controller 28 in conjunction with the fuel tank 14, including the active and passive sides 16, 18, the battery 20 and the pump 46 may be a fuel pump control system 50, in which the controller 28 controls the fuel pump 46 depending on input from the first and second indicators 38, 40 as well as the battery 20.

Figure 3:
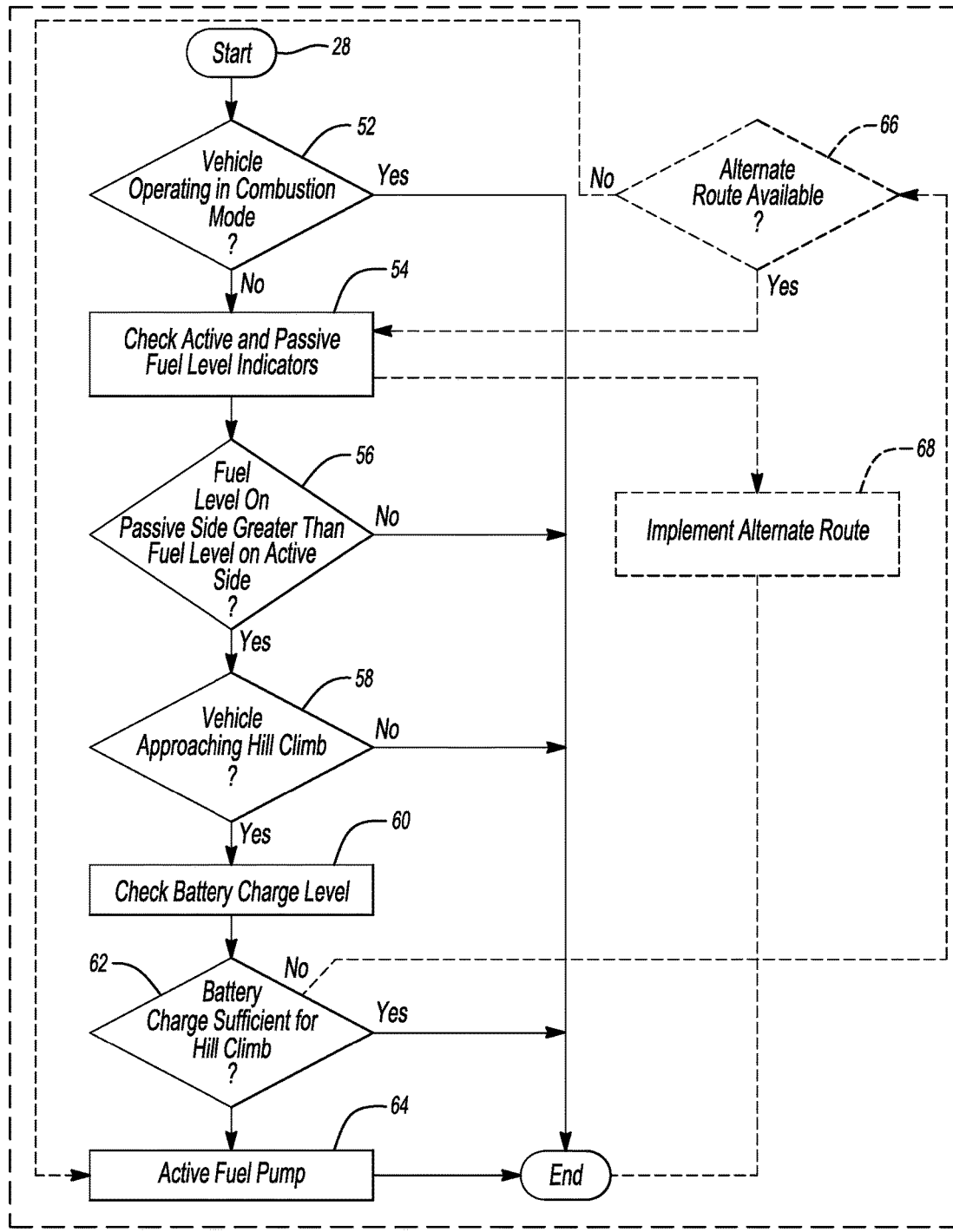
FIG. 3 is a flow diagram for a fuel pump control system for a saddle fuel tank.

FIGS. 1, 2 and 3 depict operation of the fuel pump control system 50. FIG. 1 is relied on as described above and to depict actions of the vehicle 10 described in FIG. 3. FIG. 2 is relied on as described above and to depict the components described in FIG. 3. FIG. 3 is a control logic flow diagram for the fuel pump control system 50 that instructs the controller 28 when to activate the fuel and jet pumps 46, 48 to control the fuel level 34 of the active side 16 of the fuel tank 14. FIG. 3 depicts a first embodiment of the fuel pump control system 50, which ensures the vehicle 10 has sufficient fuel to traverse the inclined roadway 12. At 52, the fuel pump control system 50 determines if the vehicle 10 is operating in the combustion mode described above. If the vehicle 10 is operating in the combustion mode at 52, the fuel pump 46 and therefore the jet pump 48 are already active in the control logic ends. If the vehicle 10 is operating in the electric mode or the hybrid mode at 52, then the fuel pump 46 and therefore the jet pump 48 are not active and the fuel pump control system 50 receives input from the first and second indicators 38, 40 to determine the first and second fuel levels 34, 36 of the active and passive side to 16, 18 of the fuel tank 14 at 54.

At 56, the fuel pump control system 50 uses the inputs of the first and second fuel levels 34, 36 at 54 to determine if the fuel level 36 on the passive side 18 is greater than the fuel level 34 on the active side 16. If the fuel level 36 on the passive side 18 is greater than the fuel level 34 on the active side 16, the fuel level 34 on the active side may be below a first threshold. The first threshold, at 54, is indicative of a fuel level 34 on the active side 16 being insufficient to traverse an inclined roadway 12, described above. If the fuel level 36 on the passive side 18 is less than the fuel level 34 on the active side 16, activation of the fuel pump 46 is unnecessary, or not needed in the control logic ends.

If, however, the fuel level 36 on the passive side 18 is greater than the fuel level 34 on the active side 16, the fuel pump control system 50 determines if the vehicle 10 is approaching a hill climb or inclined roadway 12 at 58. If at 58, the fuel pump control system 50 determines that the vehicle 10 is not approaching an inclined roadway 12 at 58, via the route guidance system 13 described above, then the fuel pump control system 50 does not need to calculate whether the active side 16 has a fuel level 34 sufficient to traverse the hill climb, or inclined roadway 12 and the control logic ends. If at 58, the fuel pump control system 50 determines that the vehicle 10 is approaching an inclined roadway 12 at 58, the fuel pump control system 50 checks a battery charge level at 60.

The battery charge level at 60 is indicative of an amount of charge stored within the battery 20. The controller 28 may be further configured to determine whether the battery charge level at 60 is above a second threshold at 62. The second threshold at 62 may be indicative of whether the amount of charge stored within the battery 20 is sufficient to traverse the hill climb, or inclined roadway 12. Therefore, at 62, the fuel pump control system 50 compares the battery charge level at 62 and the inputs from the first and second indicators 34, 36 at 54 to determine whether the vehicle 10 has sufficient power to traverse the hill climb or inclined roadway 12. If at 62, the fuel pump control system determines that the battery 20 has a charge sufficient to traverse the inclined roadway 12, either individually or in combination with the input of the fuel level 34 of the active side 16 at 54, the control logic ends.

If at 62, the fuel pump control system 50 determines that the battery 20 does not have a charge sufficient to traverse inclined roadway 12, either individually or in combination with the input of the fuel level 34 of the active side 16 at 54, the fuel pump control system 50 may activate the fuel pump at 64. Activating the fuel pump at 64 may also activate the jet pump 48, as described above, to siphon fuel from the passive side 18 to the active side 16 such that the active side 16 has a fuel level 34 sufficient to traverse the hill climb, or inclined roadway 12. The fuel pump control system 50 ensures that the vehicle 10 has enough power to reverse an inclined roadway 12 without stalling.

A further embodiment of the fuel pump control system 50 instructs the controller 28 when to activate the fuel and jet pumps 46, 48 to control the fuel level 34 of the active side 16 of the fuel tank 14 using the alternate route 19 described above. As stated above, the alternate route 19 may be any route differing from the current route 17 that causes the vehicle 10 to execute a maneuver 15 that transfers fuel from the passive side 18 to the active side 16. Referring back to 62, if the battery 20 does not have a sufficient charge to traverse the inclined roadway 12, the fuel pump control system 50 may determine if the alternate route 19 is available at 66. If at 66, the fuel pump control system 50 does not determine that the alternate route 19 is sufficient to transfer fuel from the passive side 18 to the active side 16 in order to allow the vehicle 10 to traverse the inclined roadway 12, the fuel pump control system 50 may activate the fuel pump at 64 such that fuel from the passive side 18 is siphon to the active side 16 as described above.

If, however, the fuel pump control system 50 determines at 66 that the alternate route 19 includes a maneuver 15 to transfer sufficient fuel to the active side 16, the fuel pump control system 50, via the route guidance system 13, may instruct the controller 28 to implement the alternate route 19 at 68 instead of activating the fuel pump 46 at 64. When, at 66, the fuel pump control system 50 calculates the alternate route 19, the fuel pump control system 50 uses input from the first and second indicators 34, 36 at 54. For example, at 66, the fuel pump control system 50 may use the amount 42 of fuel within the active side 16 and the amount 44 of fuel within the passive side 18 to determine whether the maneuver 15 is sufficient to increase the amount 42 of fuel within the active side 16 two above the first threshold at 56. If the maneuver 15 is sufficient, the fuel pump control system 50 implements the alternate route 19 at 68. If the maneuver 15 is not sufficient, the fuel pump control system 50 activates the fuel pump at 64. The sufficiency of the maneuver 15 is described as being determined by a fuel transfer amount from the passive side 18 to the active side 16. However, the sufficiency of the maneuver 15 may also include other factors including, but not limited to, increased distance of the alternate route 19, increased duration of overall travel time of the vehicle 10, and a difference between the fuel efficiency of the current route 17 and the alternate route 19.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
a fuel tank having a passive side and an active side, each of the sides including a fuel level indicator;
a jet pump disposed within the active side and being configured to maintain a fuel level above a first threshold, based on each of the indicators, on the active side by siphoning fuel from the passive side during operation in a combustion mode; and
a controller configured to, in response a battery charge level being below a second threshold during operation in an electric mode and a detected hill climb via a route guidance system, activate the jet pump to siphon fuel such that a fuel level within the active side rises above the first threshold.

2. The vehicle of claim 1 further comprising a fuel pump connected with the jet pump, and being configured to activate the jet pump to provide fuel to an engine.

3. The vehicle of claim 1, wherein the controller is further configured to, in response to the fuel level being less than the first threshold, initiate a maneuver such that fuel is transferred from the passive side to the active side.

4. The vehicle of claim 1, wherein the controller is further configured to, in response to the detected hill climb and an availability of an alternate route having a maneuver to transfer fuel from the active side to the passive side, operate the route guidance system to select the alternate route.

5. The vehicle of claim 4, wherein the controller is further configured to, in response to the availability of the alternate route, compare an estimated fuel transfer amount to the first and second thresholds before selecting the alternate route.

6. The vehicle of claim 5, wherein the controller is further configured to, in response to the estimated fuel transfer amount in addition to the fuel level being less than the first threshold, abort selecting the alternate route.

7. The vehicle of claim 5, wherein the controller is further configured to, in response to the estimated fuel transfer amount in addition to the fuel level being less than the first threshold and the battery charge being less than the second threshold, abort selecting the alternate route.

8. A vehicle control method comprising:
in response to detecting a hill climb via a guidance system during operation in an electric mode when a charge level of a battery is below a second threshold and a fuel level in an active side of a fuel tank is below a first threshold, activating a fuel pump to draw fuel from a passive side of the fuel tank to raise the fuel level above the first threshold.

9. The vehicle control method of claim 8 further comprising in response to the detecting and an availability of an alternate route having a maneuver to transfer fuel from the active side to the passive side, operating the guidance system to select the alternate route.

10. The vehicle control method of claim 9 further comprising in response to the availability of the alternate route, comparing an estimated fuel transfer amount to the first and second thresholds before selecting the alternate route.

11. The vehicle control method of claim 10 further comprising in response to the comparing and the first and second thresholds being greater than the first threshold, initiating the maneuver.

12. The vehicle control method of claim 10, wherein the comparing further includes detecting if the estimated fuel transfer amount in addition to the fuel level and battery charge provides sufficient power to drive the vehicle during the hill climb.

* * * * *